(No Model.)

J. D. IHLDER.
SAFETY DEVICE FOR ELECTRIC MOTORS.

No. 560,503. Patented May 19, 1896.

Witnesses
Charles E. Graves.
A. N. Dobson.

Inventor
John D. Ihlder
By Foster Freeman
Attorneys

United States Patent Office.

JOHN D. IHLDER, OF YONKERS, NEW YORK, ASSIGNOR TO THE OTIS BROTHERS & COMPANY, OF NEW YORK, N. Y.

SAFETY DEVICE FOR ELECTRIC MOTORS.

SPECIFICATION forming part of Letters Patent No. 560,503, dated May 19, 1896.

Application filed September 12, 1892. Renewed April 23, 1896. Serial No. 588,831. (No model.)

*To all whom it may concern:*

Be it known that I, JOHN D. IHLDER, a citizen of the United States, residing at Yonkers, in the county of Westchester and State of New York, have invented certain new and useful Improvements in Safety Devices for Electric Motors, of which the following is a specification.

My invention relates to safety devices for electric motors; and it has for its object to provide means whereby in case of accident to the motor the circuits thereof will be automatically controlled, so as to prevent danger from accidents.

To these ends it consists in the various features of construction and arrangement and having the mode of operation substantially as hereinafter more particularly pointed out.

Figure 1:
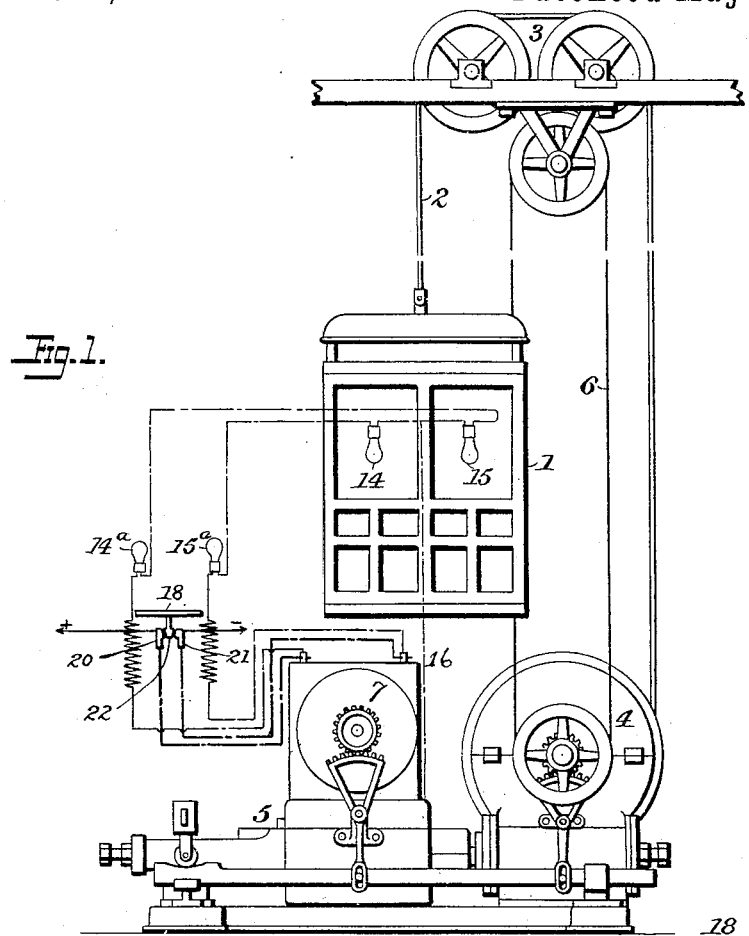
Figure 2:
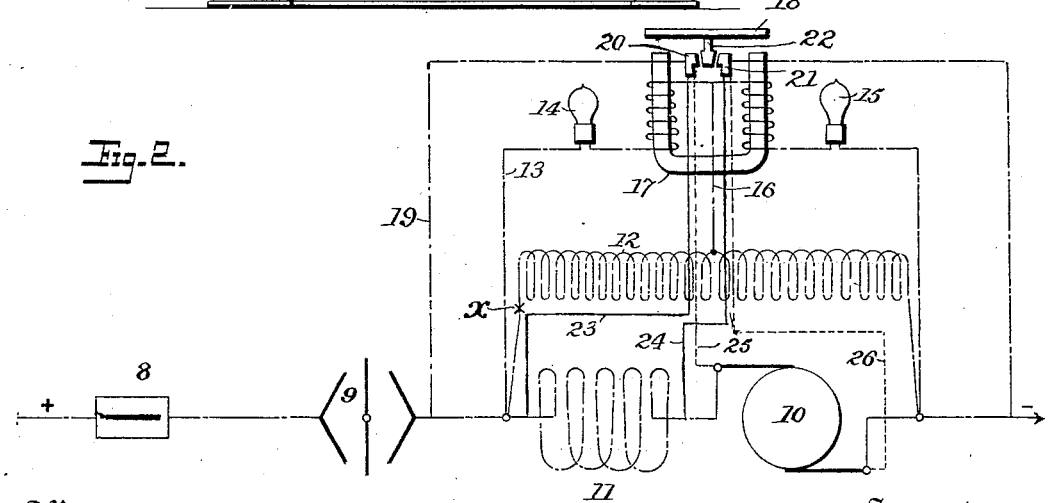

Referring to the accompanying drawings, Figure 1 is a general view showing my improvement applied to a motor connected to run an elevator, and Fig. 2 is a diagrammatic view showing the preferred arrangement of circuits.

It is well known that an ordinary shunt-wound motor will maintain an approximately constant speed under all variations of load and even when it is doing no work, and in the case where such a motor is used in connection with elevators or hoisting machinery and the cage is descending under the weight of its load, and the motor driven by the descending cage, the motor will still maintain a constant speed. It is also well known that in a series-wound motor the speed varies in accordance with the load and will under a light or no load reach a dangerously high speed. It is further well known that a motor short-circuited on itself, or the armature of which is short-circuited, will act as a brake when connected with such a machine or device as an elevator.

It has been found in the practical operation of electric elevators, especially where they are used in connection with the general systems of electrical distribution, that it is desirable in a great many instances to make use of what is generally termed a "compound-wound" motor for propelling the cage of the elevator, and as it is possible that by accident or otherwise the shunt field-magnet coils of the motor may become deranged or even the circuit broken, so that the motor would operate as a series-wound motor and under certain circumstances would obtain an undesirable and perhaps dangerous speed, it is one of the principal objects of my invention to provide means whereby in case of such accident or derangement of the circuits the motor will automatically be so controlled as to prevent any serious results. While this is the specific object of my invention, it will be understood, of course, that the various features thereof can be used and applied for other purposes and under other conditions by those skilled in the art, so that I do not limit myself to the precise construction, arrangement, and application of my invention set forth herein.

In the drawings, Fig. 1 illustrates a conventional and well-known arrangement of an electric elevator, in which 1 is a cage connected to the suspensory rope or chains 2, which pass over suitable sheaves 3 and are wound on the drum 4, and this drum is operated by an electric motor 5, connected to the drum by suitable gears, (not shown,) and the operation of the motor and drum is controlled by a hand-rope or other equivalent device 6. The circuits of the electric motor are also controlled by a suitable switch device 7, the details of which are not illustrated, but may be of various kinds and arrangements, and the general operation need not be further described, as it is well understood by those skilled in the art.

In order that my invention may be better understood, in Fig. 2 I have shown a diagrammatic view of the circuits of the motor 5 with my arrangement applied thereto, and in this view + and − indicate the terminals of the general electric circuit furnishing power to the motor, while 8 is the ordinary safety-fuse, and 9 represents the cut-out or switch controlling the main circuit to a motor. The circuits of the motor are shown as those of an ordinary compound-wound motor, in which 10 is the armature, 11 the series field-magnet coils, and 12 the shunt field-magnet coils, and thus far the arrangement of circuits and devices is of the conventional and ordinary type.

It is apparent that if by chance the shunt field-magnet circuit 12 should be deranged or perhaps broken the motor might be converted into an ordinary series motor, and under certain conditions would attain a disagreeable and perhaps dangerous speed, and in order to provide against this and other contingencies I connect the terminals of the motor by a shunt 13, which is of high resistance and preferably provided with some indicating device or devices, as the lamps 14 15, and these are preferably arranged in such relations that under normal conditions only a sufficient current will flow through the motor-shunt to cause the lamps to be slightly red, or the other indicating devices slightly affected. I connect this motor-shunt to the shunt field-magnet coils at any desirable point by a conductor, as 16, and this is preferably connected to the motor-shunt at a point between the two indicating devices 14 15. This arrangement constitutes what I term a "duplex" shunt-circuit, inasmuch as it controls or includes two parts of the shunt field-magnet coils, either part of which may be shunted, and the duplex shunt-circuit forms a connection parallel to the shunt field-magnet circuit of the machine. By thus connecting the circuit, if perchance an accident should happen to the field-magnet coils, as a break at the point X, the current through that part of the shunt-field wire at the other side of connection 16 would continue, lamp 14 would become intensified, since the joint resistance of lamp 15 and this shunt-field part would be lower than the resistance-lamp 15 alone, so that lamp 14 would receive more current than before, and if the resistance of the lamp-circuit is made higher than the shunt-field circuit lamp 15 will receive less current than before, producing a strong contrast between the brilliancy of the two lamps. This would be noticed, the machine could be stopped, and the proper adjustment and repairs be made. These indicating devices 14 and 15 may be arranged in any convenient place, and in Fig. 1 I have shown them as arranged in the car of the elevator, while I have also shown a duplicate set, as 14ᵃ 15ᵃ, arranged adjacent the motor, so that the derangement of the circuit would be indicated at both places simultaneously, and the operator or attendant can apply the proper remedy. In order, however, to provide automatic means whereby the motor will be controlled in case of accident, I connect the motor-shunt with some sort of an electromagnetic device, which shall control the circuits of the motor and constitute a safety device, and I have shown as a convenient and satisfactory arrangement a magnet 17, the poles of which are included in each branch of the motor-shunt on either side of the connection 16, and this magnet is so wound that when the motor is operating properly the currents flowing through the two branches will practically neutralize each other, so that the armature or other equivalent device 18 will be unaffected; but when the balance of the circuit is disturbed the magnet will be energized and the armature attracted.

This electromagnetic device, which may be variously constructed, may be variously connected to render the motor inoperative or prevent its operating in a manner to do damage to its connected mechanism, and I have shown it arranged to close a shunt-circuit around the motor. Thus I have shown a shunt 19 the ends of which are connected outside of the motor and are also connected to the contacts 20 21, which may be spring-contacts, in substantially the form shown, and which are arranged so that when the armature 18 is attracted a projection or other device 22 will close this shunt-circuit and remain closed, it being locked in position, so that a shunt of low resistance shall extend around the motor and switch, which will result in completely cutting out the motor from the main circuit, and it is probable in many cases the safety-fuse 8 will be burned out, and the motor will be stopped and held in position until the proper arrangements and adjustments have been made by the attendant. While this is in many cases the preferable arrangement, I have also shown the contacts 20 and 21 as connected to the terminals of the series field-magnet coil 11 by means of the lines 23 24, and under the same conditions instead of cutting out the motor entirely and its switch device, on breakage or derangement of the field-magnet shunt-the series field-magnet coils would be short-circuited, and while there are some objections to this arrangement in many cases it would be effectual. I have also shown the contacts 20 and 21 as connected by the conductors 25 26, (shown in dotted lines,) so as to short-circuit the armature of the motor and cause it to act as a brake to stop the machine, and while this might be a severe strain upon the coils of the armature and be liable to injure it under certain conditions still it would be a safeguard and prevent danger to the elevator or other mechanism connected to the motor. These shunt-circuits may be used alternately. It will be seen that in all these various connections practically the same result will be attained, and that is the safety of the mechanism operated by the motor in case of derangement to the shunt field-magnet coils, and this is accomplished automatically by a safety device arranged in a duplex shunt-circuit jointly forming a parallel connection to the shunt field-magnet coils around the motor, which duplex shunt-circuit is preferably provided with indicating devices which may be arranged on the car or other convenient position, and indicate to the elevator-boy or other attendant any derangement of the circuits of the motor. More than that, it will be seen that the lamps or other indicating devices on the car would also serve as an indicator to the operator to show not only that the motor was operating under proper conditions, but that the circuit was completely opened when it is desired to stop the elevator, and in this way the buzzer or other signal device ordinarily used can be dispensed with, the lamps or other indicating devices in the motor-shunt answering all the requirements.

I do not claim, broadly, a safety device connected in the circuits of a motor and arranged to short-circuit the motor or open the supply-line, as my invention differs therefrom in that I provide a duplex shunt-circuit around the motor and connections with the shunt field-magnet coils, whereby the condition under which the motor is operating may be indicated and the motor controlled in a manner substantially as set forth when its circuits are deranged.

What I claim is—

1. The combination with an electric motor, of a duplex shunt-circuit of relatively high resistance including two parts of a magnet-coil, and a safety device arranged in said duplex shunt-circuit, substantially as described.

2. The combination with an electric motor, of a duplex shunt-circuit including two parts of a magnet-coil, a safety device arranged in said duplex shunt-circuit, and indicating devices also connected in said circuit, substantially as described.

3. The combination with an electric motor and elevator connected to be operated thereby, of a high-resistance shunt around the motor, and indicating devices in said shunt arranged upon the car of the elevator, substantially as described.

4. The combination with an electric motor and an elevator connected to be operated thereby, of a shunt around the motor, indicating devices in the shunt arranged upon the car of the elevator, and safety devices connected in said shunt, substantially as described.

5. The combination with a compound-wound motor, of a high-resistance circuit around the motor, and a connection between said high-resistance shunt and the shunt field-magnet coils of the motor, substantially as described.

6. The combination with a compound-wound motor, of a shunt around the motor, a connection between the shunt and the shunt field-magnet coils of the motor, and indicating devices in the shunt at either side of said connection, substantially as described.

7. The combination with a compound-wound motor, of a high-resistance duplex shunt-circuit including two parts of a magnet-coil, a safety device controlled by said duplex shunt-circuit, and a short-circuiting device controlled by said safety device, substantially as described.

8. The combination with a compound-wound motor, of a high-resistance shunt around the motor, an electromagnetic safety device in the shunt, indicating devices also arranged in the shunt, contacts as 20, 21, connected to the short circuit of the motor, and the armature operated by the safety device and controlling said contacts, substantially as described.

In testimony whereof I have signed my name to this specification in the presence of two subscribing witnesses.

JOHN D. IHLDER.

Witnesses:
 JAMES S. FITCH,
 CHARLES E. GORTON.